(12) United States Patent
Brown et al.

(10) Patent No.: US 7,079,365 B2
(45) Date of Patent: Jul. 18, 2006

(54) ELECTRICAL FAULT DETECTION SYSTEM (75) Inventors: Scott R. Brown, Wake Forest, NC (US); Kyle P. Hunter, Melbourne, FL (US); Roy S. Colby, Raleigh, NC (US)

(73) Assignee: Square D Company, Palatine, IL (US)

( * ) Notice: Subject to any disclaimer, the term of this patent is extended or adjusted under 35 U.S.C. 154(b) by 293 days.

(21) Appl. No.: 10/718,244

(22) Filed: Nov. 20, 2003

(65) Prior Publication Data
US 2004/0100742 A1 May 27, 2004

Related U.S. Application Data

(60) Provisional application No. 60/428,537, filed on Nov. 22, 2002.

(51) Int. Cl.
*H00H 3/00* (2006.01)
(52) U.S. Cl. ............................ 361/42; 361/45; 361/57; 361/63; 361/93.1
(58) Field of Classification Search ................ 361/42, 361/45, 46, 78, 79, 93.1, 93.5, 63
See application file for complete search history.

(56) References Cited

U.S. PATENT DOCUMENTS 3,801,871 A    4/1974  Loh
3,879,639 A  * 4/1975  Sircom .......................... 361/45
4,053,815 A  * 10/1977 Sircom .......................... 361/42
4,063,815 A    12/1977 Wilken et al. ................. 356/29
6,259,996 B1 * 7/2001  Haun et al. .................... 702/58

FOREIGN PATENT DOCUMENTS

CA         1006584          3/1977

* cited by examiner

*Primary Examiner*—Edward H. Tso
*Assistant Examiner*—Robert T. Dang

(57) ABSTRACT

A microcontroller-based system to detect ground-fault and grounded-neutral conditions in a monitored circuit of an electrical distribution system having line and neutral conductors. The system includes a single sensor producing an output signal responsive to current flow in both the line and neutral conductors of the monitored circuit, and a microcontroller receiving the sensor output signal and initiating the generation of a circuit status signal indicating one of a normal operating condition, a ground-fault condition or a grounded-neutral condition in the monitored circuit. The microcontroller is programmed to continuously test for ground-fault conditions by evaluating the sensor output signal and, at selected intervals, test for grounded-neutral conditions by evaluating the sensor's output signal response to a microcontroller initiated ping in the sensor circuit.

26 Claims, 9 Drawing Sheets

ELECTRICAL FAULT DETECTION SYSTEM

CROSS-REFERENCE TO RELATED APPLICATION

This invention claims the priority of U.S. Provisional Patent Application Ser. No. 60/428,537, filed Nov. 22, 2002, for "ELECTRICAL FAULT DETECTION SYSTEM."

FIELD OF THE INVENTION

The present invention relates to the detection of ground-fault and ground-neutral conditions using a microcontroller-based system.

BACKGROUND OF THE INVENTION

The present invention provides a microcontroller-based system for detecting ground-fault and grounded-neutral conditions in a monitored circuit of an electrical power distribution system having both line and neutral conductors. The system includes a sensor producing an output signal responsive to current flow in both the line and neutral conductors of the monitored circuit. The system also includes a microcontroller for receiving and evaluating the sensor output signal and initiating a circuit status signal indicating whether the monitored circuit is operating normally, has a ground-fault condition or a grounded-neutral condition. The microcontroller analyzes the sensor output signal with respect to predetermined or calculated parameters to determine if a ground-fault condition is present in the monitored circuit. At selected intervals the microcontroller initiates a pulse, referred to herein as a ping, in a resonant circuit of the sensor and analyzes the sensor's response to the ping to determine if a grounded neutral condition exists in the monitored circuit.

BRIEF DESCRIPTION OF THE DRAWINGS

In the drawings:

FIG. 2 illustrates the waveform obtained from the ping signal with no fault (FIG. 2a), a fault of about 3 ohms (FIG. 2b) and a shorted fault at 0.5 ohms (FIG. 2c);

DETAILED DESCRIPTION OF THE ILLUSTRATED EMBODIMENT

Figure 1:
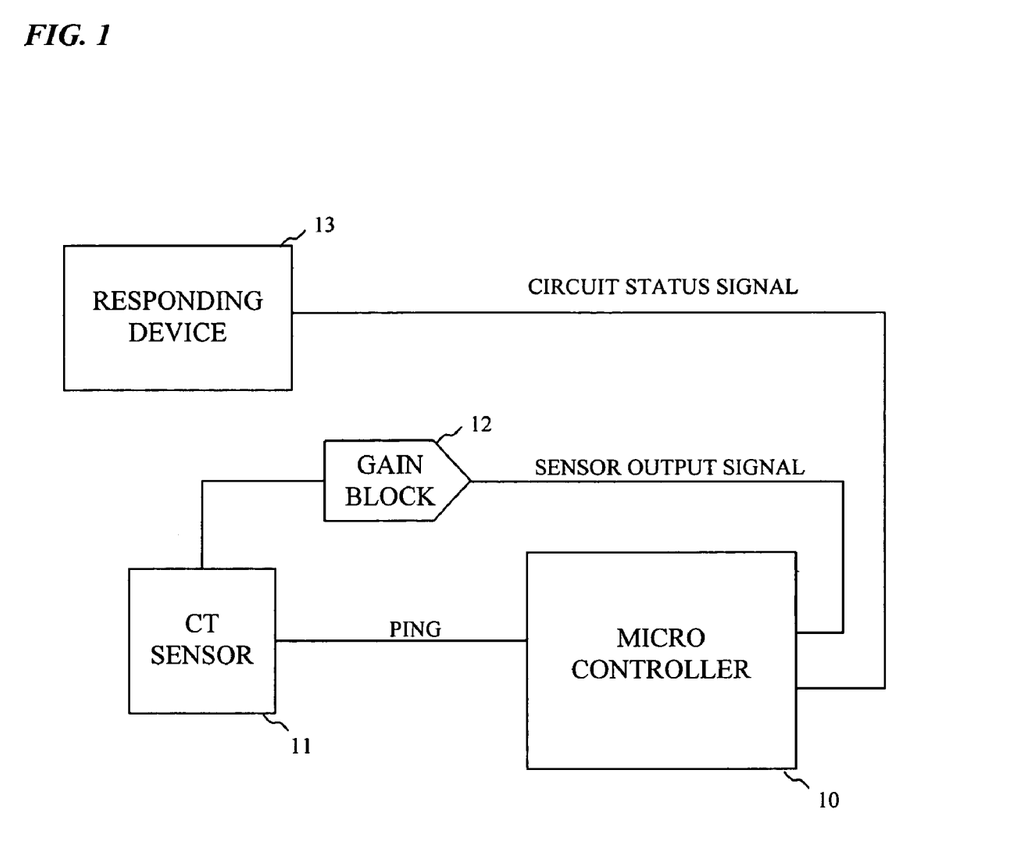
FIG. 1 is a functional block diagram of an electrical fault detection system embodying the invention.

Referring now to the drawings and initially to FIG. 1, there is shown a block diagram of one embodiment of an electrical fault detector system for detecting the occurrence of ground faults and grounded-neutral faults in an electrical circuit. This detector system includes a microcontroller 10 that uses an input signal received from a sensor 11, such as a current transformer, to determine whether a ground fault or grounded-neutral fault has occurred in the circuit being monitored, e.g., the functions required in UL 943. The sensor 11 is coupled to line and neutral conductors of the circuit being monitored for faults. When no fault conditions exist, there is no differential output signal from the sensor 11 because essentially the same current flows through both the line and neutral conductors, but in opposite directions. When a ground fault exists, a leakage path exists between the line conductor and ground, and the resulting current imbalance in the line and neutral conductors produces a differential output signal from the sensor 11. In some applications the sensor output signal may require amplification, filtering or further conditioning prior to being evaluated by the microcontroller 10 and is passed through a gain block 12, which can be a conventional operational amplifier. The microcontroller 10 analyzes the sensor output signal with respect to predetermined or calculated parameters to determine if a ground-fault or grounded-neutral condition is present in the monitored circuit and produces a circuit status signal indicating the circuit condition. A responding device 13 receives the circuit status signal and produces an appropriate output. Alternative embodiments could include an ASIC or other programmable chip device for the microcontroller 10 function. The measured signal or the output decision could be time averaged to improve noise resistance.

Figure 2A:
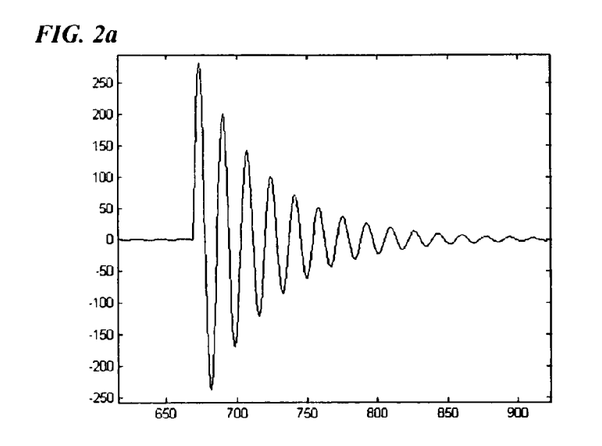
Figure 2B:
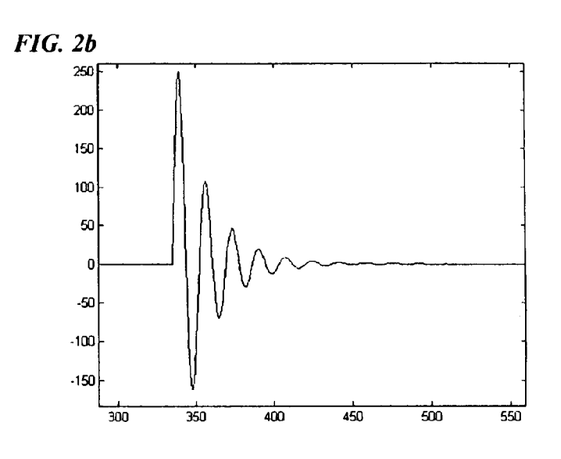
Figure 2C:
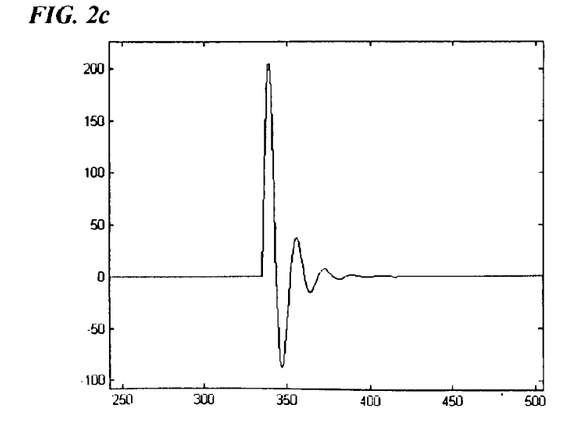

Grounded neutral detection can be performed in many ways. The underlying goal of the algorithms discussed herein is to estimate the value of the resistance of the neutral-to-ground connection. In reference to FIG. 2, this resistance is the dominating factor in the change of the decay rate of the resonant oscillation formed as a result of the ping signal. Another factor that affects the oscillation decay is the internal resistance of the sensor 11. FIG. 2a shows the resonant oscillation at about 9 ohms or no short present. FIG. 2b shows the effect of a fault at about 3 ohms. FIG. 2c shows a grounded fault condition at about 0.5 ohms. The rapid decay of the ping oscillation in the presence of fault conditions is clearly shown.

The aforementioned ping resonant oscillation can be expressed in the form of an exponential multiplied by a sinusoid as follows:

$$A \sin(\omega \tau) \times e^{-\alpha \tau}$$

'A' represents the initial amplitude of the sinusoid, $\omega$ represents the frequency of oscillation, $\tau$ represents time, $\alpha$ is the decay factor. This $\alpha$ is the combination of the elements that cause the oscillation to decay. The neutral to ground resistance is directly related to this $\alpha$. As the neutral to ground resistance goes down, $\alpha$ increases, causing the decay to be faster. In order to determine the presence of a predetermined value of neutral-to-ground resistance, this $\alpha$ parameter can be calculated or estimated by a number of methods. Each method offers benefits and compromises in terms of processing requirements and susceptibility to noise. Once estimated, the estimate may be compared to a setpoint for detection of a grounded-neutral fault. Each of the following methods can be implemented with only the positive, negative or both or absolute value of the oscillation cycles. These methods are described below:

Method 1: Envelope of Peaks—Observing that the form of the expression that describes the decaying oscillation contains a sinusoid and an exponential function, this method seeks to find the envelope exponential function. The peaks of the oscillation are located by any of a number of known methods. These peak values are used to create a model of the exponential function that envelopes the oscillation. A tangential function is used to determine the $\alpha$ value and used as the decision parameter.

Method 2: Polynomial Envelope of Peaks—This method is like Method 1 but uses a second order estimate of the function in the form $y=Ax^2+Bx+C$. A is used to estimate $\alpha$. A multi-order polynomial could also be used.

Method 3: Linear Envelope Estimate—This method is also like Method 1 except a linear fit of the peak values is found. The resulting slope of the best fit line is used to estimate α.

Method 4: Area of Cycles—This method is like Method 1 but uses an estimate of the area below the signal waveform instead of peak values. The resulting points are fit to a model. A parameter of this model is used to estimate α. This method could use an exponential, linear or polynomial model as in Methods 1, 2 and 3.

Method 5: Slope of Half Cycle—This method estimates the slope of the leading or tailing edge of a half cycle by measuring two or more points. The parameter to base decisions could be the slope of half cycle N where N is 1, 2, 3, 4 . . . .

Method 6: Function of Slope of Half Cycles—This method requires calculation of the slope of M half cycles and then use of a parameter such as the slope of the resulting M half cycle slopes.

Method 7: Threshold on the Slope of Half Cycles—This method requires calculation of the slope of M half cycles and then use of a threshold to count the number of half cycles above a preselected threshold. The number of half cycles with a slope above the threshold is used as the decision parameter. This method will be described in more detail below with reference to FIGS. 4–9.

Method 8: Count Peaks Above a Threshold—A fixed number of half cycles or a fixed timer period is monitored. During this time, the number of half cycles that cross above a preselected threshold is counted. A decision parameter based on the number of peaks above the threshold is used.

Figure 3:
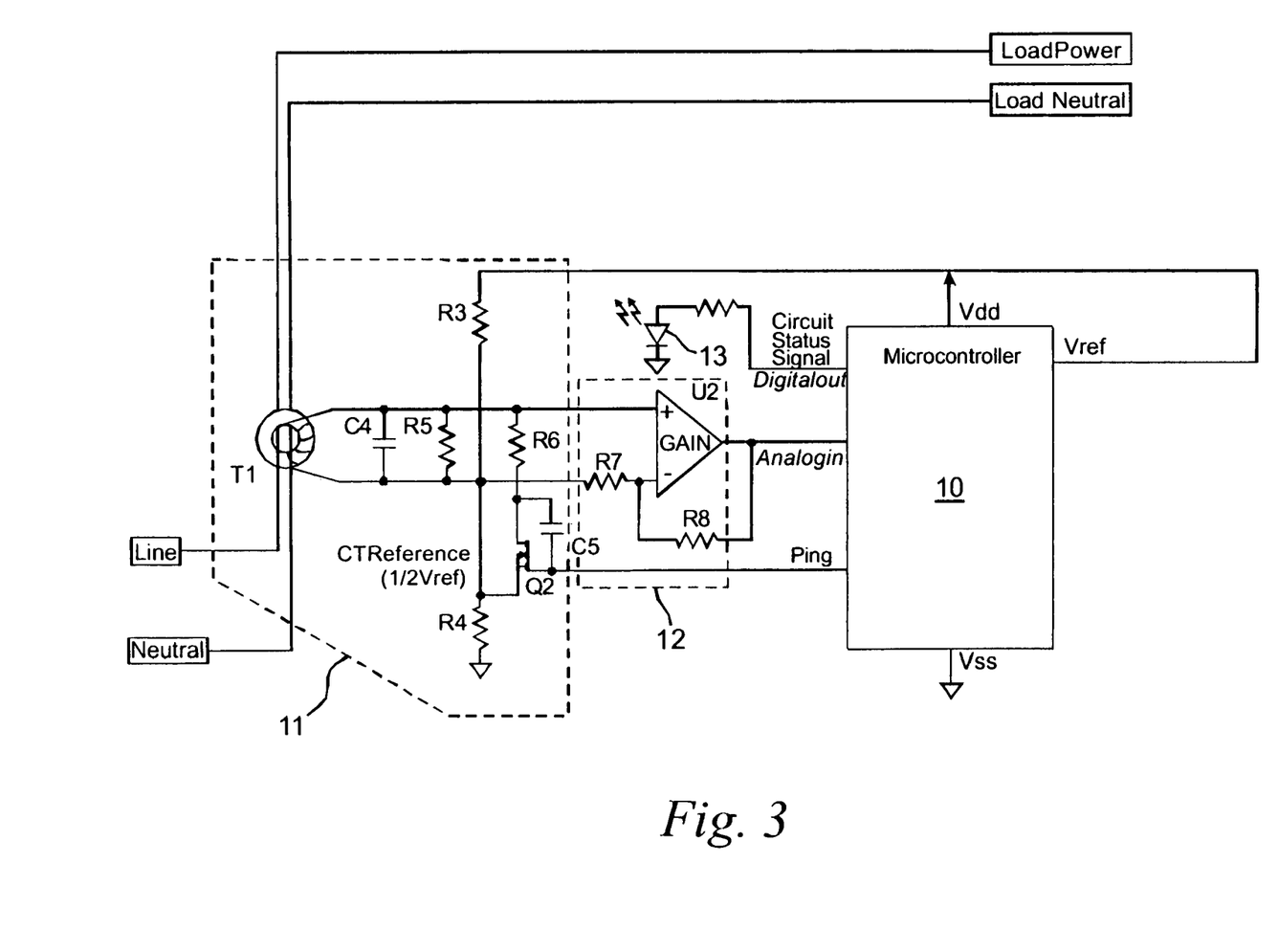
FIG. 3 is a schematic diagram of an electrical circuit for implementing the arc fault detection system illustrated in FIG. 1.

FIG. 3 is a circuit diagram of a fault detection system constructed in accordance with the present invention. The microcontroller 10 is a typical device such as the PIC12C672 microcontroller, which has an internal timer, an internal analog-to-digital (A/D) converter, and analog and digital ports, or a digital signal processor or ASIC with similar features. The sensor 11 can be as simple as a current transformer or include other components as required to enhance its operation. The sensor 11 is configured such that both the line and neutral conductors of the monitored circuit constitute the primary winding. The A/D converter built into the microcontroller 10 converts the analog sensor output signal to a corresponding digital signal.

In the illustrative example, the fault detection system responds to a fault condition by producing a circuit status signal that is supplied to a responding device 13, such as the LED shown, which indicates the circuit status signal. It is to be understood that the responding device 13 can be any device capable of producing a desired response to the circuit status signal. The microcontroller 10 continually compares the magnitude of the sensor output signal with a stored threshold value to determine whether a ground fault has occurred. The microcontroller 10 also produces a ping signal that is supplied to the sensor 11 at selected intervals to produce a response in the sensor output signal that can be analyzed to determine whether a grounded-neutral fault has occurred. When either a ground fault or a grounded neutral is detected, the microcontroller 10 produces a circuit status signal indicating a fault condition in the monitored circuit.

Figure 4:
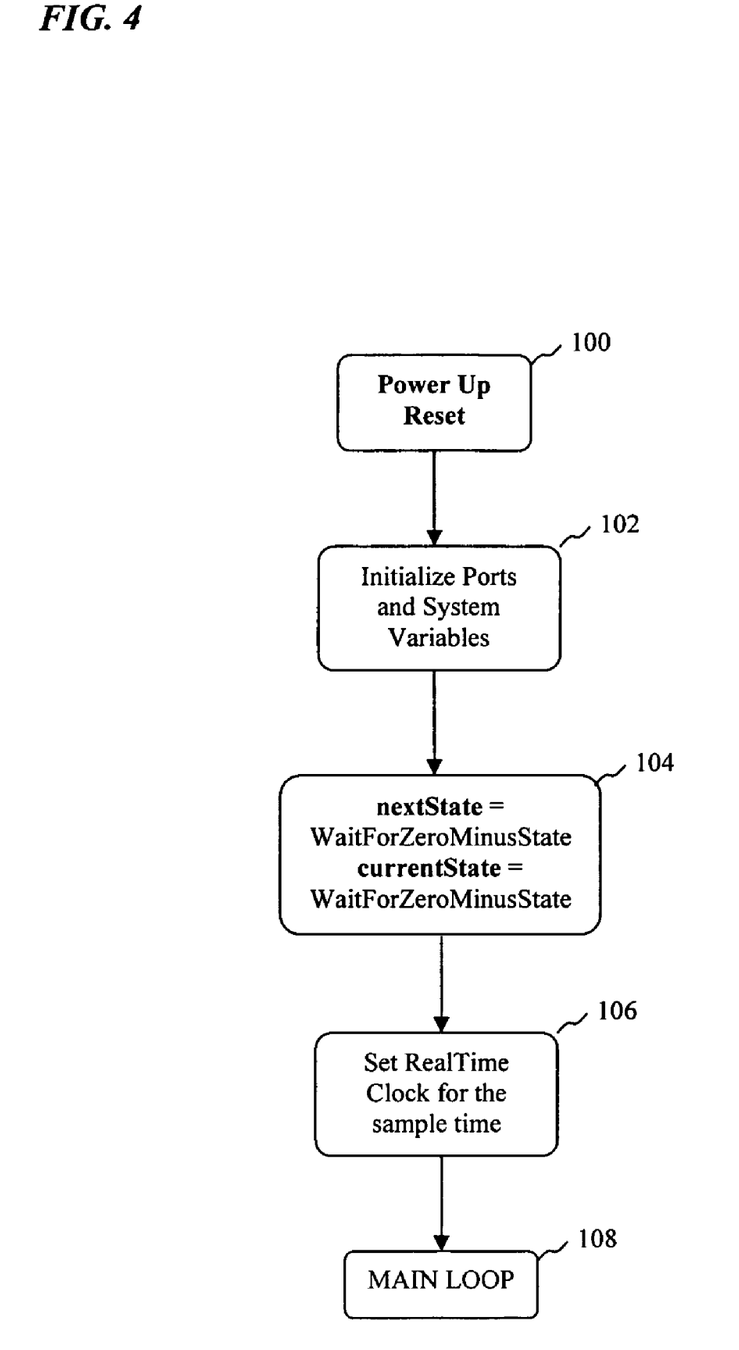
FIGS. 4–9 are flow charts of a program executed by the microcontroller in the electrical circuit of FIG. 3.
Figure 5:
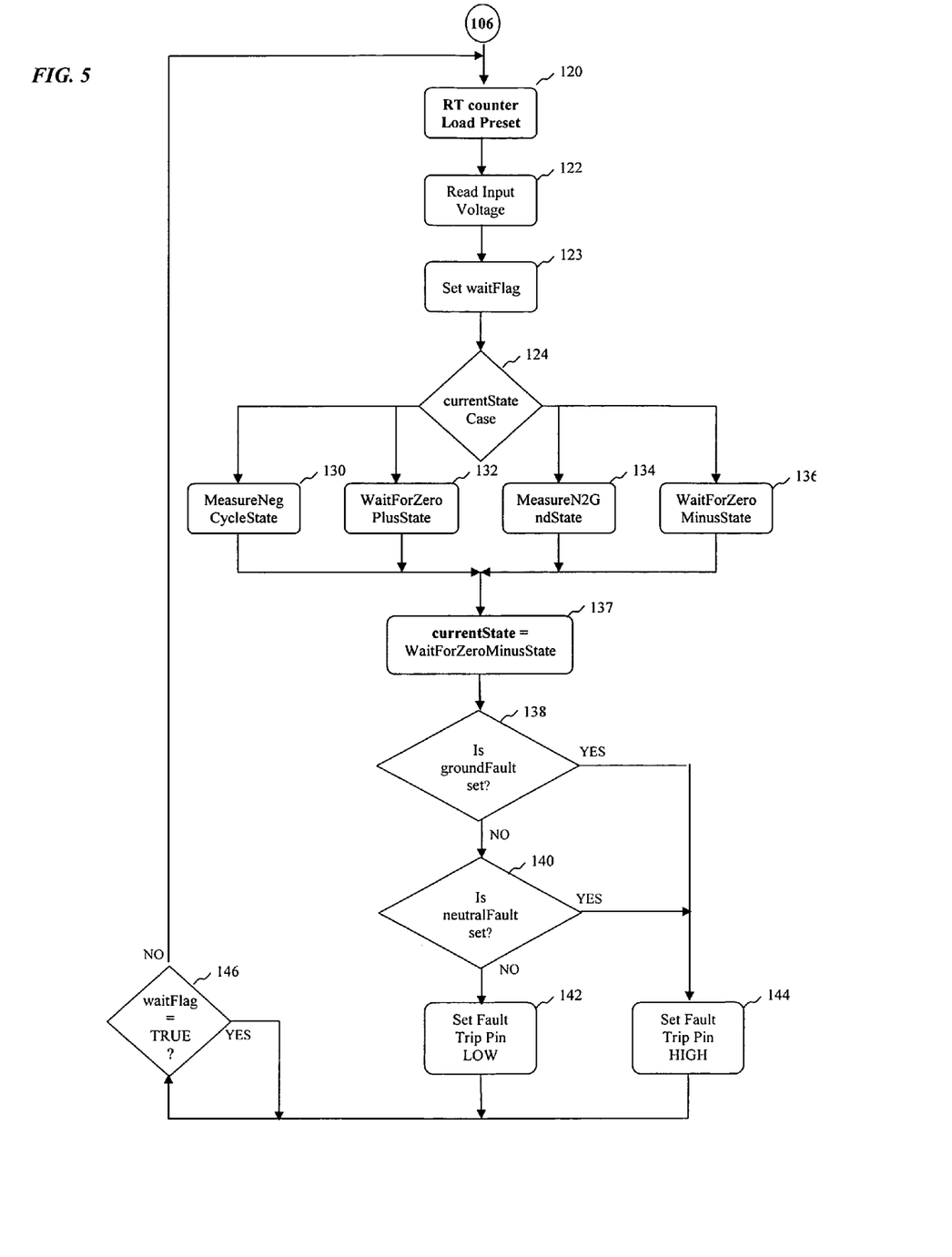

The microcontroller 10 is controlled by a program stored in memory built into the microcontroller 10. The operations carried out by the program are illustrated by the flow charts in FIGS. 4–9. Specifically, FIG. 4 represents the initializing sequence, FIG. 5 represents a main loop of the program, and FIGS. 6–9 represent four state routines that are executed selectively during iterations of the main loop. It should be noted that, while only one of the four state routines is active during each pass of the main loop, as determined by the variable currentState in the illustrated example, it is within the scope of the invention for the microcontroller 10 to process all four states during each pass of the main loop.

The routine of FIG. 4 begins upon power-up as depicted at step 100. At step 102 the microcontroller 10 initializes its various ports and system variables. At step 104 the variables currentState and nextState are initialized to the WaitForZeroMinusState. At step 106 an internal real-time counter is initialized to interrupt at a fixed interval that determines the rate at which the signal from the sensor 11 is sampled. At step 108 the microcontroller program executes the main loop until the machine is reset or power is discontinued.

FIG. 5 illustrates the program actions common to all main loop sequences. At step 120 the real time counter initialized in step 106, is loaded with a preset value, which starts the fixed sample interval. At step 122 the microcontroller 10 samples the sensor output signal (a voltage sample). This sample is used for tests and comparisons during this loop. At step 123 a waitFlag is set. At step 124, one of the four state routines is called based on the currentState variable. The four state routines will be described in detail below, including those that determine whether a ground-fault or grounded-neutral fault has occurred, in which case a corresponding fault indicator is set. The MeasuredNegCycleState represents one method for determining a ground-fault condition and the MeasuredN2GndState represents one method for determining a neutral-to-ground fault condition. Method 8 for determining a neutral-to-ground fault condition as described above has been selected for the purpose of illustrating one operating embodiment of the electrical fault detection system of the present invention. After completing the currentState routine, the currentState variable is set to the nextState value at step 137. Checks are then made at steps 138 and 140 to determine if either the ground fault or the neutral-to-ground fault indicator is set. If either fault indicator is set, then control is passed to step 144 where a fault indicator output is updated to reflect a fault status in the monitored circuit. If neither fault indicator is set, then control is passed to step 142 where the fault indicator output is updated to reflect a no-fault status in the monitored circuit. At step 146 the program waits for the waitFlag to be cleared by an interrupt service routine, thus ending the fixed sample interval. When the waitFlag is cleared, the program returns to step 120 of the main loop.

Figure 6:
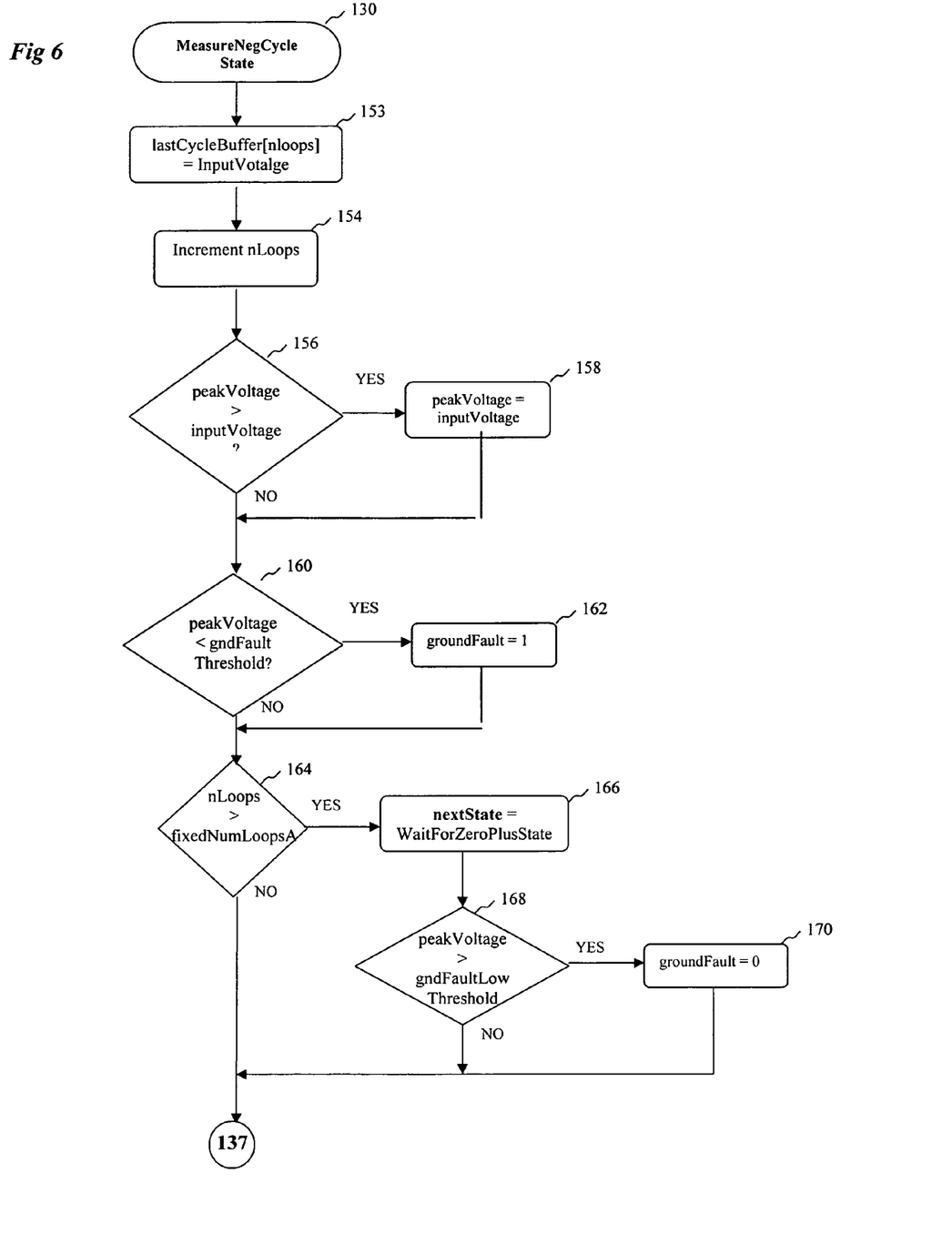

FIG. 6 illustrates the MeasureNegCycleState routine entered at step 130. This state is active for a selected number of loops, fixedNumloopsA, during which a check for a ground fault condition is made. This particular routine or determining a ground fault condition monitors the lowest voltage of a negative voltage cycle, and if it falls below a threshold value then a ground fault indication is declared. The MeasureNegCycleState routine begins by storing the input voltage in an array at step 153 for the next execution of the MeasureN2GndState routine. The loop number is incremented at step 154. At step 156 the last peak voltage is compared to the current input voltage, and if the latter is greater, the value of the peak voltage is replaced by the lower voltage at step 158. At step 160 the peak voltage is compared to a ground-fault HIGH threshold value, stored in the built-in memory of the microcontroller 10. If the peak voltage is less than the ground-fault HIGH threshold value, the ground fault indicator is set at step 162. Step 164 determines whether the number of loops so far is greater than fixedNumloopsA. If the answer is negative, the program returns to the main loop at step 137. If the answer at step 164 is affirmative, then nextState is set to WaitForZeroPlusState at step 166, and step 168 determines whether the peak voltage is greater than a ground-fault LOW threshold value. An affirmative answer at step 168 indicates that a ground-fault condition is not present in the monitored circuit and the program returns to the main loop at step 137.

Figure 7:
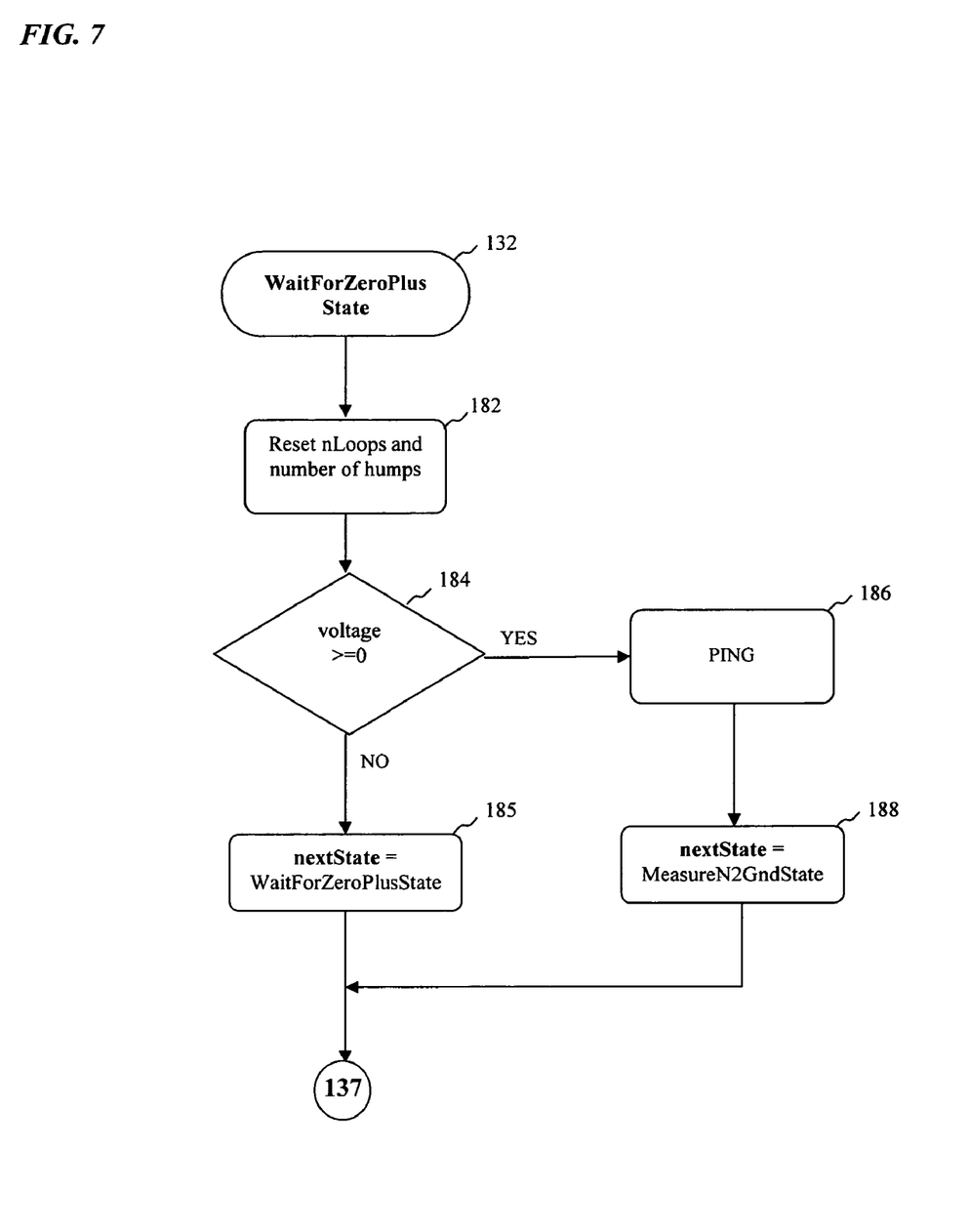

FIG. 7 illustrates the WaitForZeroPlusState routine entered at step 132. The function of the WaitForZeroPlusState is to set up a circuit oscillation or ringing which provides the basis for detecting a neutral-to-ground fault condition in the monitored circuit. First, the WaitForZeroPlusState waits to detect a voltage which is zero or greater, and then produces a ping output from the microcontroller 10. This ping is supplied to the sensor 11 by the microcontroller 10 causing the resonant circuit to oscillate at its resonant frequency in a decaying fashion for a short period of time during which the neutral-to-ground test is conducted by the microcontroller 10. At step 182 the counters are cleared. Step 184 determines whether the input voltage from the sensor 11 is equal to or greater than zero and, if the answer is negative, then the WaitForZeroPlusState state is maintained at step 185 and the program returns to the main loop at step 137. If the answer at step 184 is affirmative, indicating that the voltage from the sensor 11 is zero or greater, then control is passed to step 186. At step 186 a short pulse or ping is applied to the resonant circuit in the sensor 11. Then step 188 changes nextState to MeasureN2GndState, and the program returns to the main loop at step 137.

Figure 8:
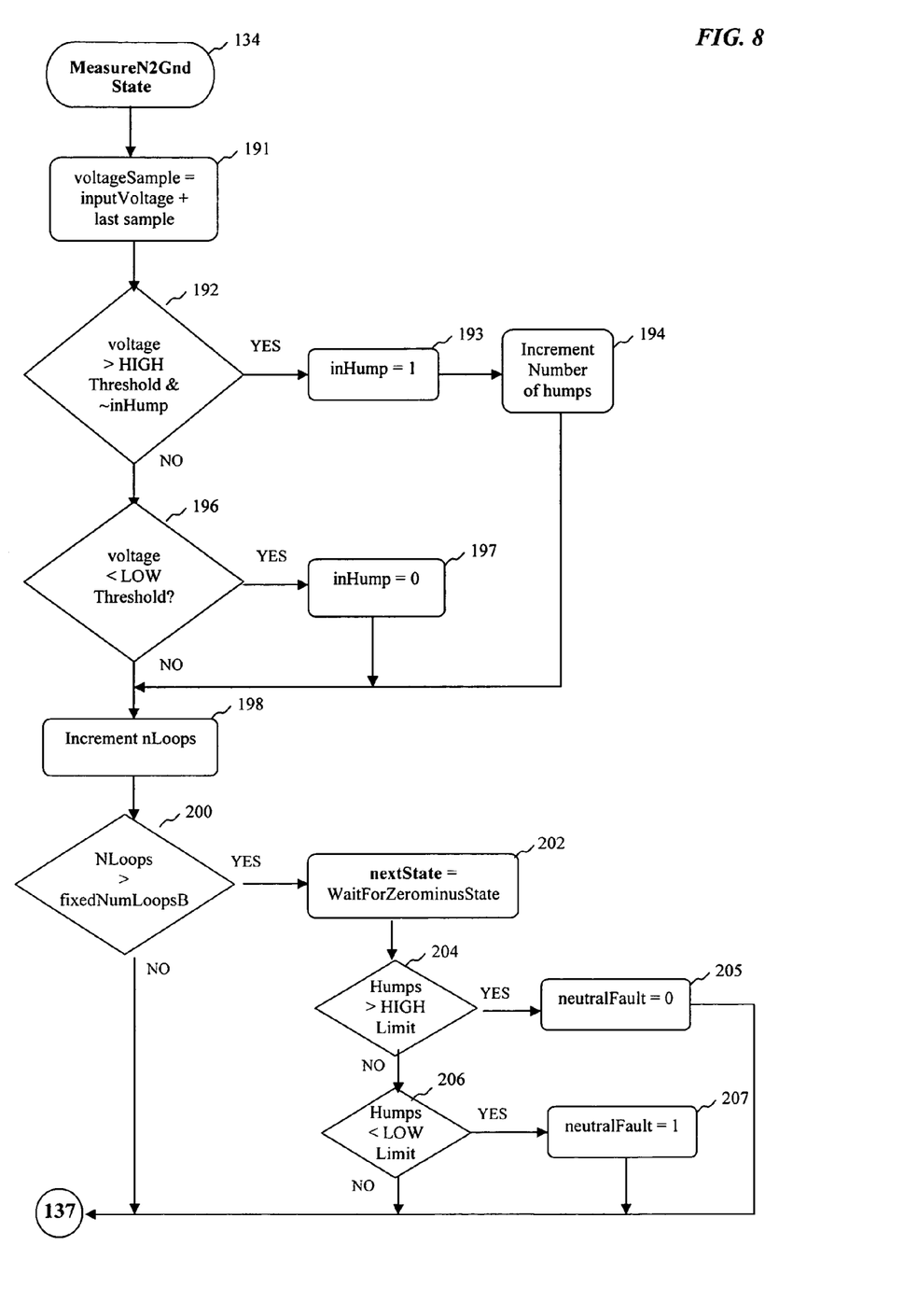

FIG. 8 illustrates the MeasureN2GndState routine that is entered at step 134. It is to be understood that the steps shown in FIG. 8 are representative of those required for method 8, as described above, and that other methods for determining a neutral-to-ground fault condition could require different steps. This state performs a neutral-to-ground test by monitoring the rate of decay of the oscillation induced in the sensor circuit by the ping signal mentioned above. Specifically, the number of half cycles of this oscillation (humps), over a preselected threshold are counted during a predetermined fixed time period, fixedNumloopsB. The rate of decay in the amplitude of the oscillations will be faster when damping is present, and a rate of decay in excess of a preselected neutral-to-ground value threshold indicates a neutral-to-ground fault condition in the monitored circuit. At step 191 a sample is computed by adding the present input voltage to a corresponding input voltage sampled in the previous negative ½ cycle previously stored at step 153 of the MeasureNegCycleState routine. Then step 192 determines whether the resulting value is greater than a preselected hump detected HIGH threshold value and whether this hump has already been counted. If the answer at step 192 is affirmative, control is passed to step 193 to indicate that a hump has been detected, to set a hump detection indicator to TRUE, and to increment the number of detected humps by one at step 194. If the answer at step 192 is negative, control is passed to step 196 to determine whether the magnitude of the voltage sample is less than a preselected no-hump detection LOW threshold value. If the answer at step 196 is negative, the hump detection indicator is set to FALSE, and control is passed to step 198 where the number-of-loops counter is incremented, and then to step 200. At step 200 a check is made to determine whether the predetermined fixed time period, fixedNumloopsB, has expired. If the answer at step 200 is negative, control is passed back to the main loop at step 137. If the answer at step 200 is affirmative, indicating that fixedNumloopsB has expired, control is passed to step 202 where nextState is set to WaitForZeroMinusState. From step 202, control is passed to steps 204 and 206 to check the number of humps detected. Step 204 determines whether the number of humps counted is greater than a preselected no neutral-to-ground HIGH limit threshold, and if the answer is affirmative, the neutral-to-ground fault indicator is set to FALSE (0) and control is passed to the main loop at step 137. If the answer at step 204 is negative, step 206 compares the number of humps counted to a preselected neutral-to-ground LOW limit threshold value. If the number of humps is less than the neutral-to-ground LOW limit threshold value, the presence of a neutral-to-ground fault in the monitored circuit is suspected and thus the neutral-to-ground fault indicator is set to TRUE (1), and control is returned to the main loop at step 137.

Figure 9:
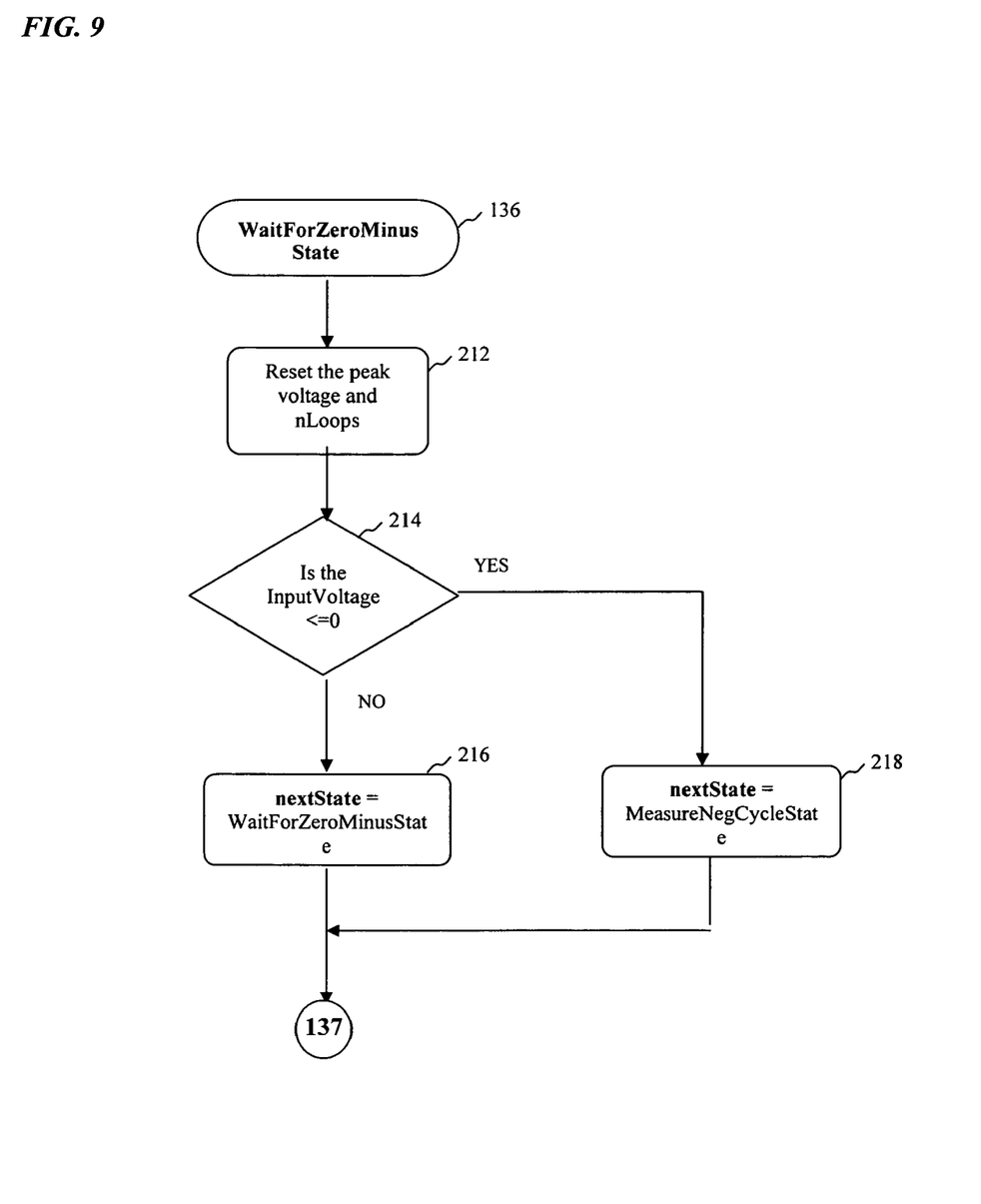

FIG. 9 illustrates the WaitForZeroMinusState routine entered at step 136 following the neutral-to-ground test to synchronize and reset all the loop counters. At step 212 the peak voltage and the number-of-loops counter are set to zero. Step 214 then determines whether the input voltage is less than or equal to zero. If the answer at step 214 is affirmative, the nextState is set in step 218 to MeasureNegCycleState, and control is returned to the main loop at step 137. If the answer at step 214 is negative, nextState is set or maintained as the WaitForZeroMinusState, and control is passed to the main loop at step 137.

In one embodiment, the microcontroller 10 is programmed to detect grounded-neutral conditions by using the sensor output signal to estimate the impedance of the neutral-to-ground connection in the power distribution system. In another embodiment, the microcontroller 10 is programmed to compare the sensor output response with a reference value to determine whether a grounded-neutral condition has occurred.

While particular embodiments and applications of the present invention have been illustrated and described, it is to be understood that the invention is not limited to the precise structures disclosed herein and that various modifications, changes, and variations may be apparent from the foregoing descriptions without departing from the spirit and scope of the invention as defined in the appended claims.

What is claimed is:

1. A microcontroller-based system for detecting ground-fault and grounded-neutral conditions in an electrical power distribution system having line and neutral conductors, comprising a sensor producing an output signal responsive to current flow in both the line and neutral conductors of the electrical power distribution system, a circuit interrupter for interrupting current flow in said power distribution system in response to a trip signal, a microcontroller receiving said sensor output signal and initiating the generation of a trip signal upon detection of a ground-fault or a grounded-neutral condition in said power distribution system, said microcontroller being programmed to use said sensor output signal to detect ground-fault conditions during spaced time intervals, and use said sensor output signal to detect grounded-neutral conditions during intervening time intervals between said spaced interval.

2. The system of claim 1 wherein said microcontroller is programmed to detect ground-fault conditions by comparing the magnitude of said sensor output signal with a predetermined ground-fault threshold value.

3. The system of claim 1 wherein said microcontroller is programmed to detect grounded-neutral conditions by using said sensor output signal to estimate the impedance of the neutral-to-ground connection in said power distribution system.

4. A microcontroller-based system for detecting ground-fault and grounded-neutral conditions in an electrical power distribution system having line and neutral conductors, comprising
- a sensor producing an output signal responsive to current flow in both the line and neutral conductors of the electrical power distribution system,
- a circuit interrupter for interrupting current flow in said power distribution system in response to a trip signal.
- a microcontroller receiving said sensor output signal and initiating the generation of a trip signal upon detection of a ground-fault or a grounded-neutral condition in said power distribution system, said microcontroller being programmed to
  - use said sensor output signal to detect ground fault conditions during spaced time intervals,
  - use said sensor output signal to detect grounded-neutral conditions during intervening time intervals between said spaced interval by using said sensor output signal to estimate the impedance of the neutral-to-ground connection in said power distribution system, and initiating a ping signal in each of said intervening
  - intervals to produce a damped oscillation in said sensor output signal.

5. The system of claim 4 wherein said microcontroller is programmed to estimate the slope of the leading or tail edge of the half cycles of said damped oscillation by measuring two or more points, within a preselected time interval following the initiation of said ping signal, to determine said grounded-neutral condition.

6. The system of claim 4 wherein said microcontroller is programmed to calculate the slope of M half cycles of said damped oscillation within a ;reselected time interval following the initiation of said ping signal, and to use said slope to determine said grounded-neutral condition.

7. The system of claim 4 wherein said microcontroller is programmed to compare the peak amplitude of a M half cycles of said damped oscillation with a preselected grounded-neutral threshold value, for each cycle of said damped oscillation within a preselected time interval following the initiation of said ping signal to determine said grounded-neutral condition.

8. The system of claim 4 wherein said microcontroller is programmed to monitor a plurality of half cycles and use the number of half cycles above a preselected threshold, within a preselected time interval following the initiation of said ping signal, to determine said grounded-neutral condition.

9. The system of claim 4 wherein said microcontroller is programmed to determine a grounded neutral condition bawd on a decay factor of a damped oscillation, within a preselected time interval following the initiation of said ping signal, in the presence of a grounded neutral condition.

10. The system of claim 9 and further where said decay actor is determined by observing a tangential function of an envelope of the peak amplitudes of said damped oscillation.

11. The system of claim 9 and further where said decay factor is determined by calculating a second order estimate of an envelope of the peak amplitudes of said damped oscillation.

12. The system of claim 9 and further where said decay factor is determined by calculating a slope of a linear fit of the peak amplitudes of said damped oscillation.

13. The system of claim 9 and further where said decay factor is determined by calculating an estimate of the area below the signal waveform peaks of said damped oscillation.

14. The system of claim 1 wherein said sensor has a single transformer for sensing current in both said line and neutral conductors.

15. A microcontroller-based system for detecting ground-fault and grounded-neutral conditions in an electrical power distribution system having line and neutral conductors, comprising
- a sensor, containing a single current transformer producing an output signal responsive to current flow in both the line and neutral conductors of the electrical power distribution system,
- a microcontroller receiving said sensor output signal and initiating the generation of a trip signal upon detection of said ground-fault or said grounded-neutral condition in said power distribution system, said microcontroller being programmed to
  - use said sensor output signal to detect ground-fault conditions during spaced time intervals, and
  - use said sensor output signal to detect grounded-neutral conditions during intervening time intervals between said spaced time intervals, and
- a circuit interrupter for interrupting current flow in said power distribution system in response to said trip signal.

16. A method of detecting ground-fault and grounded-neutral conditions in an electrical power distribution system having both line and neutral conductors, comprising
- producing a signal responsive to current flow in both the line and neutral conductors of the electrical power distribution system,
- supplying said signal to a microcontroller that is programmed to
  - use said signal to detect ground-fault conditions during spaced time intervals,
  - use said signal to detect grounded-neutral conditions during intervening time intervals between said spaced intervals,
  - initiate the generation of a trip signal upon detection of a ground-fault or a grounded-neutral condition, and
- interrupting current flow in said power distribution system in response to said trip signal.

17. The method of claim 16 wherein ground-fault conditions are detected by comparing the magnitude of said signal with a predetermined threshold value.

18. The method of claim 16 wherein grounded-neutral conditions are detected by using said signal to estimate the resistance of the neutral-to-ground connection in said power distribution system.

19. A method of detecting ground-fault and grounded-neutral conditions in an electrical power distribution system having both line and neutral conductors. comprising
- producing a signal responsive to current flow in both the line and neutral conductors of the electrical power distribution system.
- supplying said signal to a microcontroller that is programmed to
  - use said signal to detect ground-fault conditions during spaced time intervals by comparing the magnitude of said signal with a predetermined threshold value, use said signal to detect grounded-neutral conditions during intervening time intervals between said spaced intervals by estimating the resistance of the neutral-to-ground connection in said power distribution system, initiate a ping signal in each of said intervening time intervals to produce a damped oscillation in said signal, and compares said damped oscillation with a reference value to determine whether a grounded-neutral condition has occurred, initiate the generation of a trip signal upon detection of a ground-fault or a grounded-neutral condition, and interrupting current flow in said power distribution system in response to said trip signal.

20. The method of claim 19 wherein said microcontroller compares the peak amplitude of said damped oscillation with a preselected grounded-neutral threshold value, for each cycle of said damped oscillation within a preselected time interval following the initiation of said ping signal.

21. The system of claim 16 wherein current in both said line and neutral conductors is sensed with a single transformer.

22. A method of detecting ground-fault and grounded-neutral conditions in an electrical power distribution system having both line and neutral conductors and a sensor circuit producing a signal responsive to current flow in both the line and neutral conductors of the electrical power distribution system, comprising using a real-time clock to produce spaced time intervals, sampling said signal at said spaced time intervals, using the signal sample from each spaced time interval to detect a ground-fault condition, and setting a ground-fault indicator in response to the detection of a ground-fault condition, using said signal sample to detect a neutral-to-ground fault condition, and setting a neutral-to-ground fault indicator in response to the detection of a neutral-to-ground fault condition, initiating the generation of a trip signal in response to the setting of a ground-fault or a neutral-to-ground indicator, and interrupting current flow in said power distribution system in response to said trip signal.

23. The method of claim 22 wherein said signal sample is used to detect a ground-fault condition by monitoring the lowest voltage of a negative voltage cycle, and setting said ground-fault indicator if said lowest voltage falls below a predetermined high threshold value.

24. The method of claim 22 wherein said signal sample is used to verify a ground-fault condition by monitoring the lowest voltage of a negative voltage cycle, and resetting the ground-fault indicator if said lowest voltage is higher than a predetermined low threshold value.

25. The method of claim 22 wherein said signal sample is used to initiate a ping signal to induce a resonant voltage oscillation in said sensor circuit if said signal sample is of zero or greater voltage.

26. The method of claim 25 wherein said signal sample is used to determine the presence of a neutral-to-ground condition by monitoring the rate of decay of said induced resonant oscillation in said sensor circuit, and setting said neutral-to-ground fault indicator if said rate of decay is in excess of a predetermined neutral-to-ground threshold value.

* * * * *